United States Patent [19]
DeLong

[11] 3,895,600
[45] July 22, 1975

[54] INDICATING DEVICE
[75] Inventor: Robert J. DeLong, Temple City, Calif.
[73] Assignee: Spectrol Electronics Corporation, City of Industry, Calif.
[22] Filed: May 8, 1974
[21] Appl. No.: 468,043

[52] U.S. Cl.......... 116/115; 116/124 A; 116/124 L; 116/124.2 A; 188/327; 188/343
[51] Int. Cl.......................... H03j 1/02; F16d 51/22
[58] Field of Search............ 116/115, 124 A, 124 L, 116/124.2 A; 188/78, 325, 327, 330, 343

[56] References Cited
UNITED STATES PATENTS
2,746,417  5/1956   McCord et al...................... 116/115
2,901,998  9/1959   Keith ................................. 116/115
3,202,127  8/1965   Struble et al. ..................... 116/115

*Primary Examiner*—Richard E. Aegerter
*Assistant Examiner*—Steven L. Stephan
*Attorney, Agent, or Firm*—J. Raymond Curtin; Barry E. Deutsch

[57] ABSTRACT

A device for indicating the angular position of a rotatable shaft and having a first indicator dial secured to the rotatable shaft for rotation therewith. The device includes a brake having first and second braking positions. The brake when in its first braking position preventing rotation of the rotatable shaft except upon application of a force of a relatively large magnitude to the shaft. The brake when in its second braking position preventing any rotation of the rotatable shaft.

8 Claims, 3 Drawing Figures

PATENTED JUL 22 1975
3,895,600
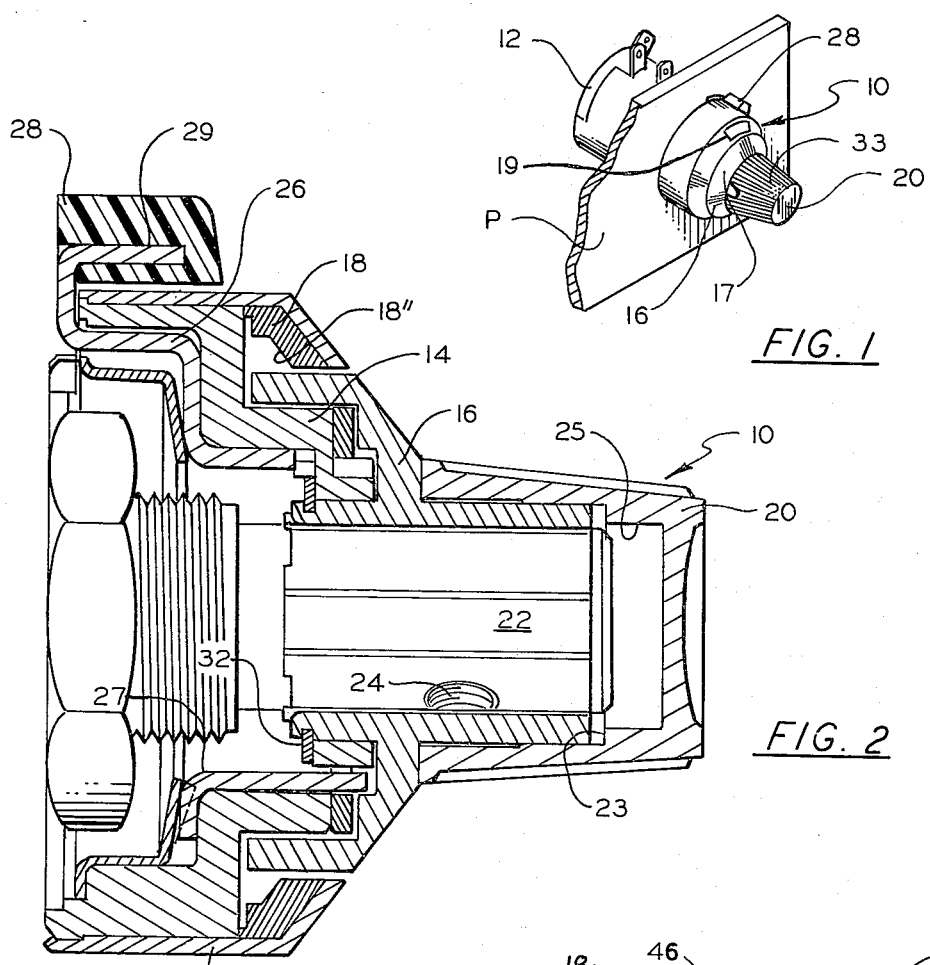
FIG. 1
FIG. 2
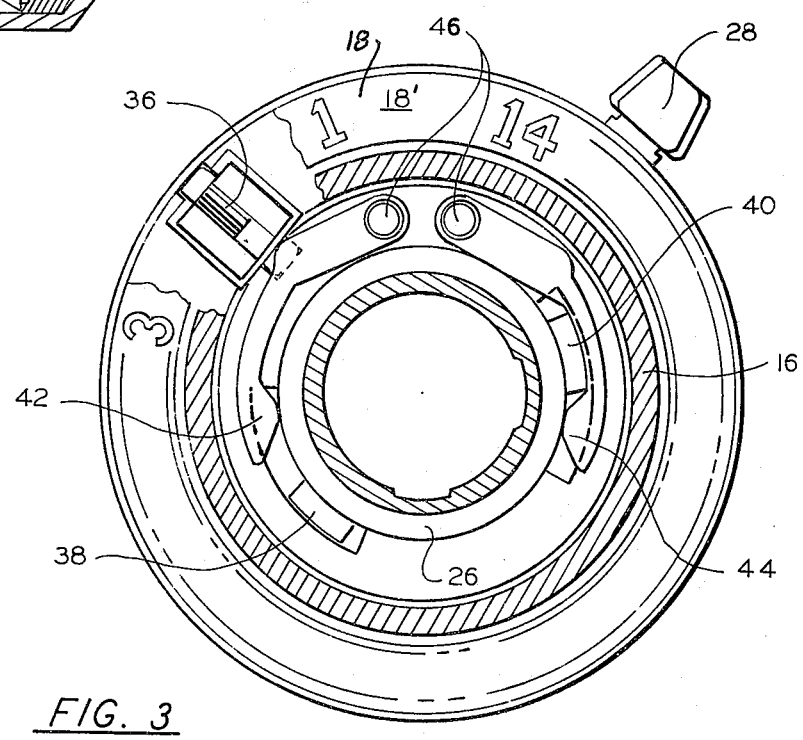
FIG. 3

3,895,600

INDICATING DEVICE

BACKGROUND OF THE INVENTION

This invention relates to a device for indicating the angular position of a rotatable shaft, and in particular to a novel brake therefor.

There are many known indicating devices capable of controlling and/or indicating the angular position of a rotatable member, such as a shaft. The indicating device is utilized to indicate the number of revolutions and/or fraction of a revolution through which the shaft has been rotated. The indicating device may be similarly utilized to control and/or indicate the angular position of an element, for example, a contact member, carried by the rotatable member, or to control and/or indicate the position of an element driven by the rotatable member, or to indicate the position of an element which drives a rotatable member. An example of a prior art indicating device of the type herein disclosed is illustrated in U.S. Pat. No. 2,746,417, issued May 22, 1956. Indicating devices of the present type are particularly suitable for use with apparatus such as variable resistors.

As noted hereinabove, indicating devices not only function to indicate the angular position of a rotatable member, but also function to rotate the rotatable member to control the angular position thereof.

When the indicating device is connected to apparatus such as a variable resistor, very often, it is installed in areas wherein the device may be subjected to vibrations, for example due to the operation of relatively large machinery. Such vibrations may cause inadvertent rotation of the device to thereby provide a false or incorrect reading. Additionally, the device may be exposed so that operators or other personnel working nearby may inadvertently rotate the same.

For this reason, it has been the practice to provide indicating devices with brakes to positively lock the mechanism thereof at a desired setting. Heretofore, such brakes have either been in an off position whereat the device might be readily rotated, or in the alternative, in a fully locked position wherein any rotation of the device is prevented. An example of prior art braking devices is disclosed in the aforecited United States patent.

Such two position brakes have not been entirely satisfactory, since at times it is desirable that the device be readily rotatable, yet include the capability of not being rotated upon the application of a small inadvertent force.

SUMMARY OF THE INVENTION

Accordingly, it is an object of the present invention to provide a novel indicating device.

It is a further object of the present invention to provide an indicating device having an improved brake.

It is yet another object of the present invention to provide an indicating device having a brake operable to prevent rotation except upon application of a force of a relatively large magnitude when in a first braking position and to prevent any rotation when in a second braking position.

These and other objects of the present invention are obtained by a device for indicating the angular position of a rotatable shaft and having a first indicating dial secured to the rotatable shaft for rotation therewith. The device includes brake means having first and second braking positions, the brake means when in its first braking position preventing rotation of the shaft except upon application of a force of a relatively large magnitude. The brake means when in its second braking position operating to prevent any rotation of the shaft.

As used herein, the phrase "force of a relatively large magnitude" means a force capable of producing a torque to cause the rotatable member to rotate; the force overcoming the force developed by the braking means when in its first braking position.

BRIEF DESCRIPTION OF THE DRAWING

FIG. 1 is a perspective view of an indicating device employed with a variable resistor;

FIG. 2 is a sectional view of the indicating device illustrated in FIG. 1; and

FIG. 3 is a vertical sectional view of the device, illustrating details of the present invention.

DESCRIPTION OF THE PREFERRED EMBODIMENT

Referring to the drawings there is disclosed a preferred embodiment of the present invention. In referring to the several figures of the drawing, like numerals shall refer to like parts.

Referring now particularly to FIG. 1, there is disclosed a preferred embodiment of indicating device 10. Indicating device 10 is connected to a rotatable member, such as a shaft, of an apparatus, such as variable resistor 12. Indicating device 10 and variable resistor 12 are mounted on a control panel P or similar mounting means.

Referring particularly to FIG. 2, there is disclosed a sectional view of indicating device 10. Device 10 includes a non-rotatable base member 14. A portion of base member 14 journals a first rotatable indicator dial 16. Dial 16 is suitably connected to a rotatable member, such as shaft 22 of variable resistor 12. A cover member 20 also journals indicator dial 16. Cover member 20 has a plurality of longitudinally extending serrations 33 which provide a gripping surface for manual rotation of the cover member. Cover member 20 has a bore 25 which includes an inwardly extending annular surface which defines a shoulder 23. A set screw or similar device provided in threaded opening 24, connects indicator dial 16 and cover member 20 to shaft 22 to rotate therewith. Dial 16 has a plurality of numerals or similar indicia on a peripheral surface 17 thereof to provide visual means by which the fractional degree of rotation of shaft 22 may be readily ascertained.

Device 10 includes a second rotatable indicator dial 18. As shown in FIG. 3, dial 18 includes a plurality of numerals or similar indicia on a peripheral surface 18' thereof. A cover 34 crimped over base 14 has a window 19, shown in FIG. 1, through which a single numeral on surface 18' may be observed. Second dial 18 is provided to indicate the total number of revolutions through which first dial 16 has been rotated.

In order to obtain the desired incremental rotation of dial 18 per each revolution of dial 16, suitable gearing is provided.

Indicator dial 18 includes a gear extending from surface 18''. The gear is constantly in mesh with a transfer gear 36 shown in FIG. 3. Indicator dial 16 includes a gear sector which meshes with transfer gear 36 once during every revolution of dial 16 to thereby incrementally rotate dial 18. The foregoing is essentially more fully disclosed in U.S. Pat. No. 2,746,417. A shim or similar means 32 is provided to prevent undesired axial movement of dial 16 relative to base 14.

As noted hereinbefore, there are many applications in which device 10 is employed in which it is desirable to prevent the rotatable member, for example shaft 22 and thus the indicator dials of the device from rotating. Also, there are other instances during which time it is desirable to have the device readily rotatable by an operator yet not be rotatable by inadvertent forces applied to either cover member 20 or shaft 22. Heretofore, indicator devices of the prior art have included braking mechanisms which either completely prevented rotation of the elements or when placed in a "brake-off" position, the slightest force might cause the elements to rotate.

The present braking mechanism, as shall be more fully explained hereinafter, provides a first brake position wherein forces of relatively small magnitude, as produced by vibration or similar inadvertent means, will not cause the rotatable member or components of device 10 to rotate. The brake mechanism, when placed in a second brake position, will prevent any rotation of the various members.

The brake mechanism of the present invention includes a brake lever 26 having annular portions 27. A retainer, illustrated as a belleville washer, maintains lever 26 axially positioned relative to base 14. Lever 26 further includes a portion 29 adapted to be received in a control knob 28. Knob 28 may be manually moved to one of three positions so as to establish the brake position for the brake mechanism. As shown in FIG. 3, brake lever 26 includes cam surfaces 38 and 40. The mechanism further includes first and second pawls 42 and 44, connected via pivots 46 to base 14.

When it is desired to place the brake mechanism in its first brake position, whereby only a relatively large magnitude force will cause rotatable member 22 to rotate, an operator moves control knob 28 clockwise as viewed in FIG. 3, to rotate brake lever 26, thus causing cam surface 40 to move first pawl 44 outwardly into engagement with the inner surface of indicator dial 16. The frictional force provided by the pawl being placed in engagement with the inner surface of dial 16 will prevent forces of relatively small magnitude from causing rotatable member 22 to rotate. However, forces of relatively large magnitude, such as provided by manual rotation of cover member 20, will rotate the various members. With the brake in its first braking position, cam surface 38 does not engage second pawl 42.

When it is desired to firmly prevent rotatable member 22 from rotating, control knob 28 is moved in a further clockwise direction to rotate brake lever 26 to cause cam surface 38 to move second pawl 42 radially outward into engagement with the inner surface of indicator dial 16. Cam surface 40 is of greater width when compared to the width of cam surface 38 to maintain engagement between surface 40 and pawl 44 when surface 38 is brought into engagement with pawl 42. The frictional force developed by having both pawls 42 and 44 engaging the inner surface of dial 16 prevents any rotation of the dial and thus of rotatable member 22 connected thereto.

When it is desired to permit free rotation of the rotatable member, the control knob 28 is moved in a counterclockwise direction so as to disengage the cam surfaces from the pawls to thereby permit the pawls to move radially inward to their normal disengaged position.

The brake mechanism heretofore described efficiently and effectively provides an operator with the means to prevent inadvertent rotation of a shaft connected to an indicator device, yet permits the operator to readily reposition the device if desired.

While a preferred embodiment of the present invention is described and illustrated, the invention should not be limited thereto, but may be otherwise embodied within the scope of the following claims.

I claim:

1. A device for indicating the angular position of a rotatable shaft comprising:
   a base member;
   a first rotatable indicator dial mounted on said base member and operably connected to said rotatable shaft for rotation therewith;
   a second rotatable indicator dial;
   gear means interconnecting said first and second indicator dials, said gear means functioning to rotate said second indicator dial incrementally once during every revolution of said first indicator dial; and
   brake means having first second and third braking positions, said rotatable shaft being freely rotatable when said brake means is in its first braking position, said brake means when in its second braking position preventing rotation of said rotatable shaft except upon application of a force of a relatively large magnitude to said shaft, and said brake means when in its third brake position preventing any rotation of said rotatable shaft.

2. A device in accordance with claim 1 wherein said brake means includes:
   a pair of pawls pivotally connected to said base member; and
   a brake lever having first and second cam surfaces, rotation of said lever in an arcuate path causing a first cam surface to engage a first pawl to place said brake means in its second braking position, further rotation of said lever causing the second cam surface to engage said second pawl to place said brake means in its third braking position.

3. A device in accordance with claim 2 wherein the width of said first cam surface is greater than the width of said second cam surface.

4. In a device for indicating the angular position of a rotatable shaft and having a first indicator dial operably connected to said shaft for rotation therewith, the improvement comprising:
   brake means having first second and third braking positions, said rotatable shaft being freely rotatable when said brake means is in its first braking position, said brake means when in its second braking position preventing rotation of said rotatable shaft except upon application of a force of a relatively large magnitude to said shaft, said brake means when in its third braking position preventing any rotation of said rotatable shaft
   a pair of pawls pivotally connected to said base member; and
   a brake level having first and second cam surfaces, rotation of said lever in an arcuate path causing a first cam surface to engage a first pawl to place said brake means in its second braking position, further rotation of said lever causing the second cam surface to engage said second pawl to place said brake means in its third braking position.

5. The combination in accordance with claim 4 wherein the width of said first cam surface is greater than the width of said second cam surface.

6. A device for indicating the angular position of a rotatable shaft comprising:
   a base member;
   a first rotatable indicator dial operably connected to said rotatable shaft for rotation therewith, said dial having a gear sector extending from a first surface thereof;
   a second rotatable indicator dial coaxial with said first dial, said second dial having a gear thereon;
   gear means rotatably mounted on said base, said gear means being meshed with said gear on said third dial and meshing with said gear sector on said first dial, once per revolution of said first dial so as to rotate said second dial once during every revolution of said first dial; and
   brake means having first second and third braking positions, said rotatable shaft being freely rotatable when said brake means is in its first braking position, said brake means when in its second braking position preventing rotation of said rotatable shaft except upon application of a force of a relatively large magnitude to said shaft, said means when in its third braking position preventing any rotation of said rotatable shaft.

7. A device in accordance with claim 6 wherein said brake means includes:
   a pair of pawls pivotally connected to said base member; and
   a brake lever having first and second cam surfaces, rotation of said lever in an arcuate path causing a first cam surface to engage a first pawl to place said brake means in its second braking position, further rotation of said lever causing the second cam surface to engage said second pawl to place said brake means in its third brake position.

8. A device in accordance with claim 7 wherein said first cam surface is of greater width than the width of said second cam surface.

* * * * *